UNITED STATES PATENT OFFICE.

CAROLENE MATHILDE EGBERT, OF WESTFIELD, PENNSYLVANIA.

COMPOUND FOR ARTIFICIAL STONE.

SPECIFICATION forming part of Letters Patent No. 414,385, dated November 5, 1889.

Application filed April 13, 1889. Serial No. 307,094. (No specimens)

*To all whom it may concern:*

Be it known that I, CAROLENE MATHILDE EGBERT, of Westfield, in the county of Tioga and State of Pennsylvania, have invented a new and useful Compound for Artificial Stone, of which the following is a full, clear, and exact description.

This invention has for its object the production of a compound which, when in its soft or molten state, is capable of being molded into any desired form, but which after hardening will make an artificial stone as durable as marble and almost or fully as hard as adamant. It is mainly designed to be used for tombstones, vases, statues, and other works of art; but it is applicable to other and various articles or structures, either plain or ornamental.

The compound is composed of the following ingredients, in or about the proportions specified: thallium glass, five pounds; calamine, two pounds; alum, two pounds; white lead, one pound; white prepared chalk, one pound; arsenic, one-half pound.

To prepare the compound, I place the above-named materials in three separate crucibles—that is to say, the thallium glass in one crucible, the calamine in another crucible, and the remaining ingredients in a third crucible. The calamine is burned till it becomes white, sufficient soda being added to whiten it. The thallium glass, which is glass made of white sand, carbonate of soda, thallium silicate, litharge, and red lead, is separately heated in its crucible to about 400° Fahrenheit, (more or less,) and the other ingredients are separately melted in their crucible. I then add the calamine to the thallium glass, and afterward add the other ingredients to the glass, stirring the whole carefully. The compound is then ready to be poured into the molds used to fashion the substance to its required form, care being taken to first oil the molds. The product is then removed and placed in an annealing-furnace, when it will become even harder than marble and more durable.

I do not restrict myself to the precise proportions of the ingredients named, and others, if desired, for coloring or other purposes, may be added.

Having thus described my invention, what I claim, and desire to secure by Letters Patent, is—

The within-described compound for use as artificial stone, the same consisting of thallium glass, calamine, alum, white lead, white prepared chalk, and arsenic, substantially as specified.

CAROLENE MATHILDE EGBERT.

Witnesses:
 H. S. POTTER,
 W. S. HUNT.